(12) United States Patent
Liu

(10) Patent No.: US 8,544,359 B2
(45) Date of Patent: Oct. 1, 2013

(54) ROBOT ARM ASSEMBLY

(75) Inventor: Chao-Qiang Liu, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 247 days.

(21) Appl. No.: 13/113,078

(22) Filed: May 23, 2011

(65) Prior Publication Data

US 2012/0103125 A1 May 3, 2012

(30) Foreign Application Priority Data

Oct. 27, 2010 (CN) .......................... 2010 1 0521473

(51) Int. Cl.
*B25J 17/00* (2006.01)
(52) U.S. Cl.
USPC .......... 74/490.01; 74/490.05; 901/27; 901/50
(58) Field of Classification Search
USPC ............... 74/490.01, 490.02, 490.03, 490.05, 74/490.06; 901/27, 28, 29, 38, 49, 50; 285/151.1, 154.4, 154.2, 154.3; 403/109.1, 403/109.4, 110
See application file for complete search history.

(56) References Cited

U.S. PATENT DOCUMENTS

| | | | | |
|---|---|---|---|---|
| 4,497,996 A * | 2/1985 | Libby et al. | .............. | 219/124.34 |
| 4,507,042 A * | 3/1985 | Suzuki et al. | .................. | 414/680 |
| 4,529,352 A * | 7/1985 | Suzuki et al. | .................. | 414/680 |
| 4,757,180 A * | 7/1988 | Kainz et al. | ................. | 219/137.2 |
| 5,155,423 A * | 10/1992 | Karlen et al. | ............. | 318/568.11 |
| 5,358,397 A * | 10/1994 | Ligon et al. | .................... | 425/145 |
| 5,562,843 A * | 10/1996 | Yasumoto | ................. | 219/124.34 |
| 5,581,166 A * | 12/1996 | Eismann et al. | ......... | 318/568.22 |
| 5,712,552 A * | 1/1998 | Hirai et al. | ................. | 318/568.1 |
| 5,816,736 A * | 10/1998 | Kroulik | .......................... | 403/389 |
| 5,841,104 A * | 11/1998 | Svensson | ................... | 219/125.1 |
| 6,267,022 B1 * | 7/2001 | Suzuki | ........................ | 74/490.01 |
| 7,104,153 B2 * | 9/2006 | Matsumoto et al. | ....... | 74/490.02 |
| 7,196,285 B2 * | 3/2007 | Inoue et al. | ................. | 219/137.9 |
| 7,419,351 B2 * | 9/2008 | Nihei et al. | .................... | 414/735 |
| 7,431,343 B2 * | 10/2008 | Chiu | ......................... | 285/151.1 |
| 7,462,803 B2 * | 12/2008 | Hubinger et al. | ......... | 219/124.34 |
| 7,979,160 B2 * | 7/2011 | Teaford et al. | ................. | 700/254 |
| 8,051,741 B2 * | 11/2011 | Inoue et al. | ................. | 74/490.01 |
| 8,266,979 B2 * | 9/2012 | Yonehara et al. | .......... | 74/490.03 |
| 8,288,687 B2 * | 10/2012 | Inoue et al. | .................... | 219/136 |
| 8,327,531 B2 * | 12/2012 | Ono et al. | ....................... | 29/783 |
| 8,371,189 B2 * | 2/2013 | Ibayashi et al. | ............ | 74/490.02 |
| 8,396,596 B2 * | 3/2013 | Oka et al. | ...................... | 700/258 |
| 2003/0200831 A1 * | 10/2003 | Matsumoto et al. | ....... | 74/490.06 |

(Continued)

*Primary Examiner* — David M Fenstermacher
(74) *Attorney, Agent, or Firm* — Altis & Wispro Law Group, Inc.

(57) ABSTRACT

A robot arm assembly includes a first shaft base, a second shaft base rotatably connected to the first shaft base, a wire harness, and a clamping mechanism for clamping the wire harness. The first shaft base defines a first through hole along a longitudinal axis, and the second shaft base defines a second through hole. The clamping mechanism includes a main body connected to the second shaft base, and a locking member engaged with the main body. The second shaft base rotates relative to the first shaft base around the longitudinal axis. The main body further comprise a clamping portion on an end thereof, and the clamping portion is capability of radial deformation. The locking member resists the clamping portion to clamp the wire harness. The wire harness extends through the first through hole, the second through hole, and then the clamping mechanism.

13 Claims, 3 Drawing Sheets

(56) References Cited

U.S. PATENT DOCUMENTS

2004/0261562 A1* 12/2004 Haniya et al. .............. 74/490.02
2005/0281660 A1* 12/2005 Nihei et al. ................... 414/735
2010/0162845 A1* 7/2010 Yonehara et al. .......... 74/490.01
2010/0229671 A1* 9/2010 Haniya et al. .............. 74/490.02
2011/0252913 A1* 10/2011 Ibayashi et al. ............ 74/490.02
2011/0252914 A1* 10/2011 Ibayashi et al. ............ 74/490.02
2012/0312116 A1* 12/2012 Yonehara et al. .......... 74/490.03

* cited by examiner

ROBOT ARM ASSEMBLY

BACKGROUND

1. Technical Field

The present disclosure relates generally to robot arm assemblies, particularly, to a robot arm assembly having a wire harness clamp.

2. Description of Related Art

Industrial robots usually include jointed multi-arms, actuating motors for driving the multi-arms, a controller for controlling the actions of the actuating motors, and a wire harness for transmitting electrical power to the actuating motors or command signals between the controller and the actuating motors. The wire harness usually extends from a base of the robot, and connects the actuating motors and the controller. However, because of the relative movement of the multi-arms, the wire harness may be easily scratched or damaged when from being pulled and dragged.

Therefore, there is room for improvement within the art.

BRIEF DESCRIPTION OF THE DRAWINGS

The components in the drawings are not necessarily drawn to scale, the emphasis instead placed upon clearly illustrating the principles of the present disclosure. Moreover, in the drawings, like reference numerals designate corresponding parts throughout the several views.

DETAILED DESCRIPTION

Figure 1:
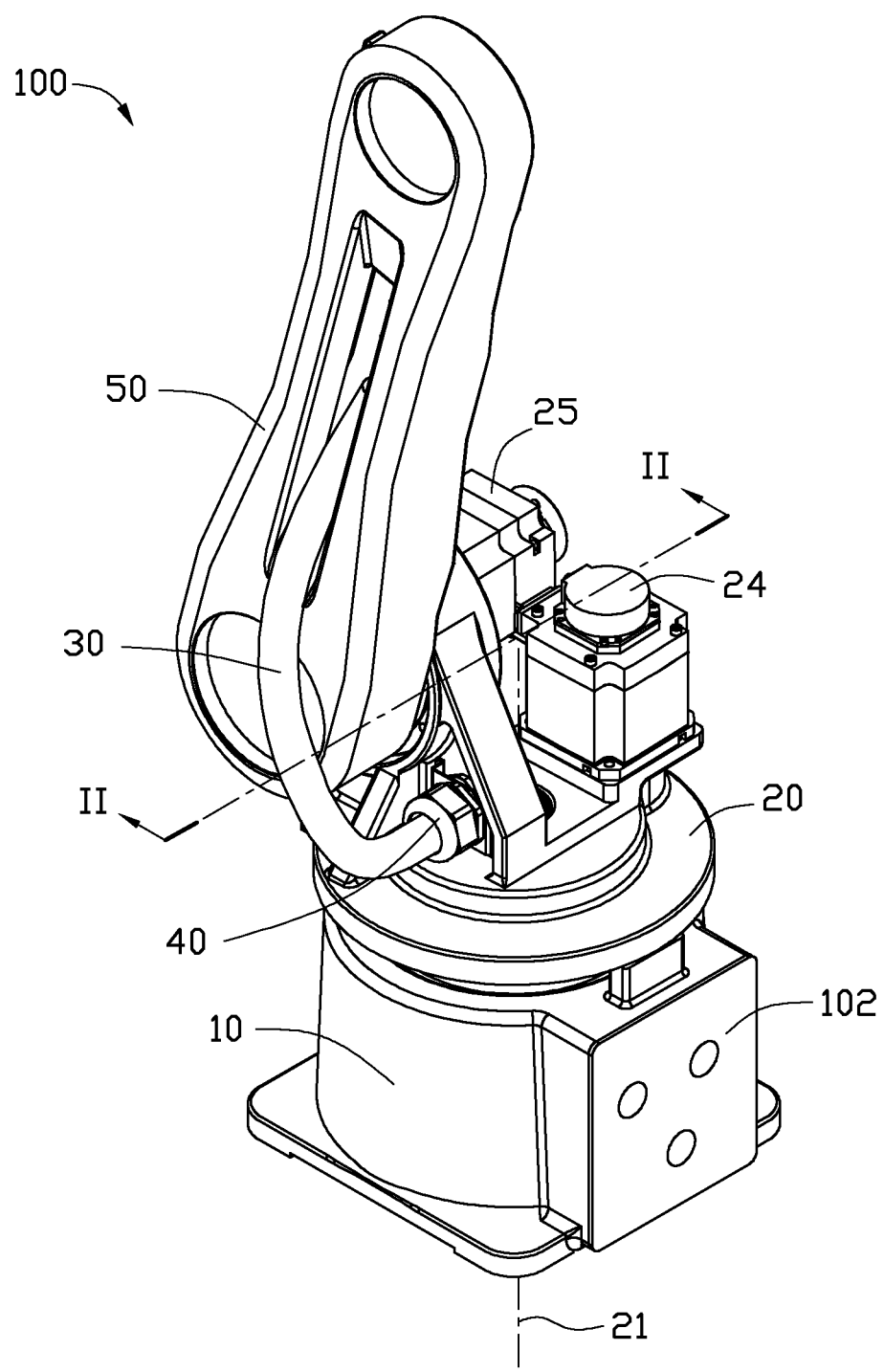
FIG. 1 is an isometric view of one embodiment of a robot arm assembly, the robot arm assembly includes a clamping mechanism.

Referring to FIG. 1, one embodiment of a robot arm assembly 100 includes a first shaft base 10, a second shaft base 20 rotatably connected to the first shaft base 10, a wire harness 30, and a clamping mechanism 40 to clamp the wire harness 30.

Figure 2:
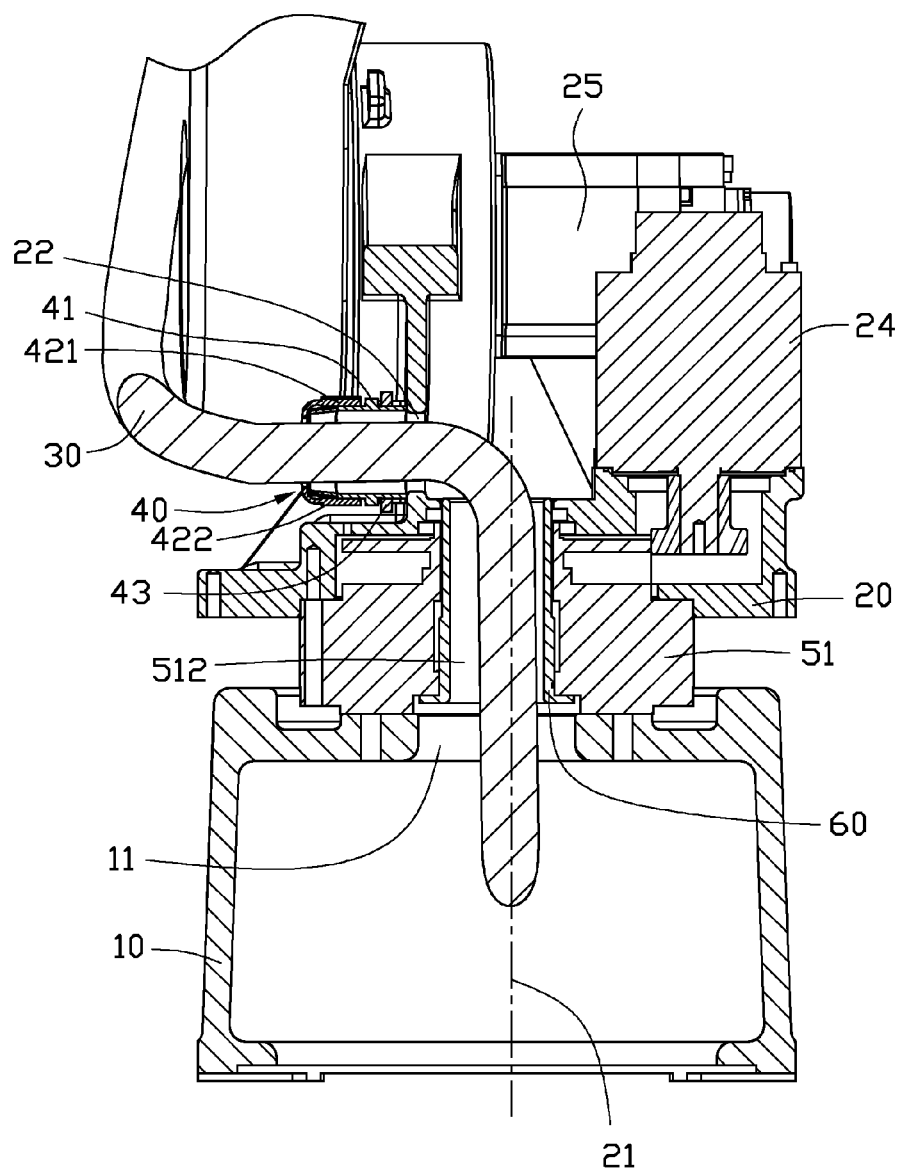
FIG. 2 is a cross-section of the robot arm assembly of FIG. 1, taken along the line

Referring to FIG. 2, the first shaft base 10 defines a first through hole 11 along a longitudinal axis 21. The second shaft base 20 can rotate around the longitudinal axis 21, and defines a second through hole 22. The wire harness 30 extends through the first through hole 11, the second through hole 22, and then the clamping mechanism 40.

In the illustrated embodiment, the robot arm assembly 100 is used in six-axis robots. The first shaft base 10 may be positioned on a mounting base, for example, a floor. The first shaft base 10 is substantially cup-shaped, and defines an opening (not shown) on a side-wall of the first shaft base 10. A connecting plate 102 is positioned on the opening for sealing the opening. One end of the wire harness 30 passes through the connecting plate 102 and connects to a controller (not shown), and the other end of the wire harness 30 passes through the first through hole 11, the second through hole 22, and connects to a plurality of actuating motors or sensors (not shown). The wire harness 30 may be a plurality of multi-wires bounded together or received in a conduit.

Referring to FIGS. 1 and 2 again, the robot arm assembly 100 further includes a robot arm 50, a cycloidal reducer 51, a first motor 24, and a second motor 25. The robot arm 50 is rotatably connected to the second shaft base 20. The cycloidal reducer 51 is positioned between the first shaft base 10 and the second shaft base 20. The first motor 24 is positioned on the second shaft base 20 for driving the second shaft base 20, and the second motor 25 is positioned on the second shaft base 20 for driving the robot arm 50. The cycloidal reducer 51 may be a rotary vector reducer. The second motor 25 is adjacent to the first motor 24, and a plurality of input shafts of the first and second motors 24, 25 are perpendicular to each other. The cycloidal reducer 51 is coupled with the first motor 24 for achieving an appropriate rotating speed and a steady rotation of the second shaft base 20.

The cycloidal reducer 51 defines a third through hole 512 corresponding to the second through hole 22 along the longitudinal axis 21 for allowing the wire harness 30 to extend through. A rubber sleeve 60 is positioned in the third through hole 512 to protect the wire harness 30 from being worn by the cycloidal reducer 51.

Figure 3:
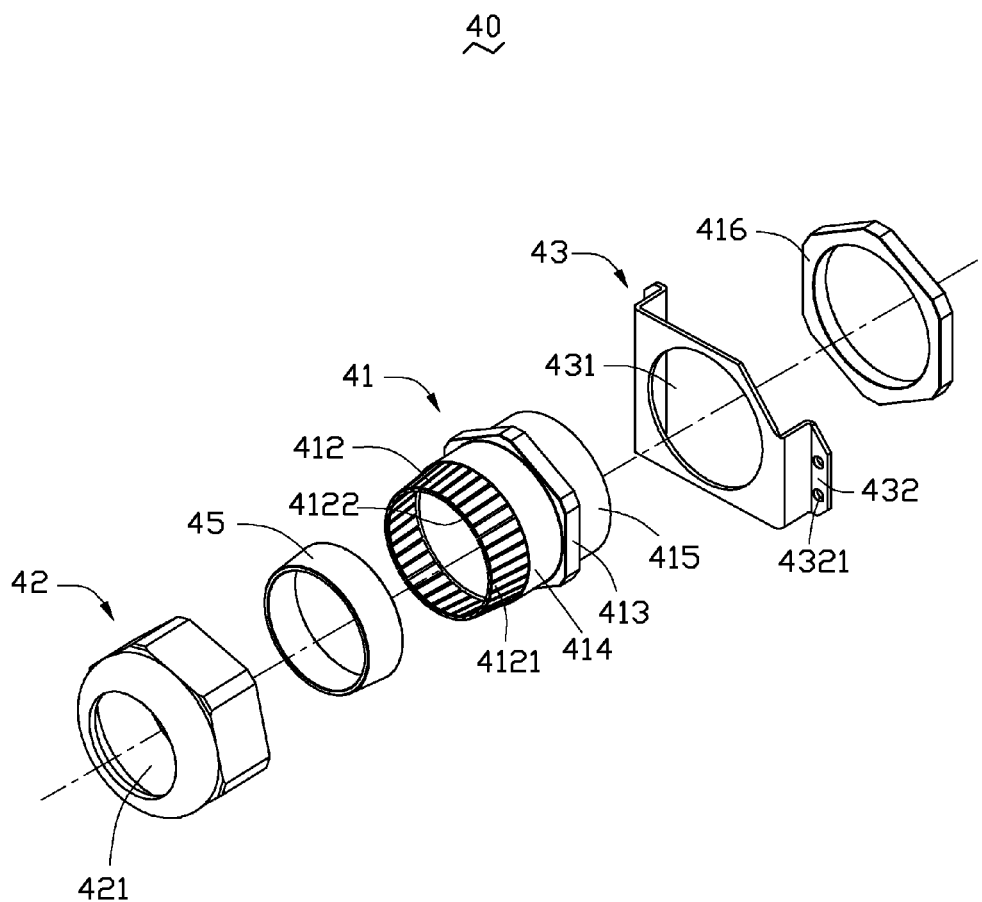
FIG. 3 is an exploded, isometric view of the clamping mechanism of the robot arm assembly of FIG. 1.

Referring to FIGS. 2 and 3, the clamping mechanism 40 includes a main body 41 connected to the second shaft base 20, and a locking member 42 engaged with the main body 41. The main body 41 forms a clamping portion 412 on one end. The clamping portion 412 can be radial deformation. The locking member 42 is threadedly-engaged with the main body 41, and forces the clamping portion 412 to clamp the wire harness 30. The clamping portion 412 tightly clamps the wire harness 30 via a radial deformation. Therefore, the wire harness 30 can be secured against the adverse effects of scraping and abrasions. The main body 41 further includes a flange 413, a first threaded portion 414, a second threaded portion 415, and a locking ring 416. The first threaded portion 414 connects the clamping portion 412. The second threaded portion 415 is formed on an end of the main body 41 opposite to the clamping portion 412. The flange 413 is formed between the first threaded portion 414 and the second threaded portion 415.

In the illustrated embodiment, the clamping portion 412 has an outer conical surface 4121, and defines a plurality of axial slits 4122 to form a flexible clamping claw. The locking member 42 is a nut, and includes an inner resisting surface 421 and an internally threaded portion 422 engaged with the first threaded portion 414. When the locking member 42 is engaged with the main body 41, the inner resisting surface 421 resists the outer conical surface 4121 to generate a radial deformation of the clamping portion 412. The deformation of the clamping portion 412 is adjustable by adjusting a relative position of the locking member 42 and the main body 41.

Referring to FIG. 3 again, in the illustrated embodiment, the clamping mechanism 40 may further include a connecting sheet 43, and a rubber clamping ring 45. The connecting sheet 43 is connected to the main body 41. The rubber clamping ring 45 is positioned between the wire harness 30 and an inner surface of the clamping portion 412. The locking ring 416 is engaged with the second threaded portion 415.

In the illustrated embodiment, the connecting plate 43 is substantially U-shaped, and defines a through hole 431 corresponding to the main body 41. The connecting plate 43 further includes two connecting portions 432 outwardly extending from two opposite edges of the connecting plate 43. The connecting plate 43 is sleeved on the second threaded portion 415 of the main body 41 via the through hole 431 and resisting the flange 413. The locking ring 416 is engaged with the second threaded portion 415 to fix the connecting plate 43 to the main body 41. Each of the connecting portions 432 defines a plurality of through holes 4321. The connecting plate 43 is fixed to the second shaft base 20 with a plurality of screws (not shown) screwed through the corresponding through holes 4321.

It is believed that the present embodiments and their advantages will be understood from the foregoing description, and it will be apparent that various changes may be made thereto without departing from the spirit and scope of the disclosure or sacrificing all of its material advantages.

What is claimed is:

1. A robot arm assembly, comprising:
a first shaft base defining a first through hole along a longitudinal axis;
a second shaft base defining a second through hole, the second shaft base rotatably connected to the first shaft base;
a wire harness; and
a clamping mechanism for clamping the wire harness, the clamping mechanism comprising a main body connected to the second shaft base, and a locking member engaged with the main body, wherein the second shaft base rotates relative to the first shaft base around the longitudinal axis, the main body comprises a clamping portion on an end thereof, and the clamping portion is capable of radial deformation, the clamping portion forms an outer conical surface, and defines a plurality of axial slits in the outer conical surface; the locking member comprises an inner resisting surface resisting the outer conical surface to generate a radial deformation of the clamping portion to clamp the wire harness; and the wire harness extends through the first through hole, the second through hole, and then the clamping mechanism.

2. The robot arm assembly of claim 1, wherein the clamping mechanism further comprises a connecting plate connected to the main body, and the main body connects to the second shaft base by the connecting plate.

3. The robot arm assembly of claim 2, wherein the connecting plate is substantially U-shaped, and defines a through hole corresponding to the main body; the connecting plate further comprises two connecting portions extending from two opposite edges of the connecting plates outwardly; each of the connecting portions defines a plurality of through holes, and the connecting plate is fixed to the second shaft base by a plurality of screws screwed through the through holes of the connecting portions.

4. The robot arm assembly of claim 2, wherein the main body further comprises a flange, a first threaded portion, a second threaded portion, and a locking ring; the first threaded portion connects the clamping portion; the second threaded portion is formed on an end of the main body opposite to the clamping portion; the flange is formed between the first threaded portion and the second threaded portion; the locking ring is engaged with the second threaded portion; the locking member is engaged with the first threaded portion, and the connecting plate is sleeved on the second threaded portion and fixed by the locking ring.

5. The robot arm assembly of claim 1, wherein the clamping mechanism further comprises a rubber clamping ring positioned between the wire harness and an inner surface of the clamping portion.

6. The robot arm assembly of claim 1, further comprising a robot arm rotatably connected to the second shaft base, a first motor positioned on the second shaft base for driving the second shaft base, and a second motor positioned on the second shaft base for driving the robot arm; the second motor is adjacent to the first motor.

7. The robot arm assembly of claim 6, further comprising a cycloidal reducer positioned between the first shaft base and the second shaft base, and coupled with the first motor; the cycloidal reducer defines a third through hole corresponding to the second through hole along the longitudinal axis.

8. The robot arm assembly of claim 7, further comprising a rubber sleeve positioned in the third through hole.

9. The robot arm assembly of claim 1, wherein the first shaft base defines an opening on a side-wall, and the robot arm assembly further comprise a connecting plate sealing the opening; an end of the wire harness passes through the connecting plate.

10. A clamping mechanism for clamping a wire harness, comprising:
a main body, comprising a clamping portion formed on an end thereof, the clamping portion comprising an outer conical surface, and defining a plurality of axial slits in the outer conical surface; and
a locking member engaged with the main body, and comprising an inner resisting surface resisting the outer conical surface to generate a radial deformation of the clamping portion to clamp the wire harness.

11. The clamping mechanism of claim 10, wherein the clamping mechanism further comprises a connecting plate connected to the main body, and a locking ring engaged with the main body.

12. The clamping mechanism of claim 11, wherein the main body further comprises a flange, a first threaded portion, a second threaded portion, and a locking ring; the first threaded portion connects the clamping portion; the second threaded portion is formed on an end of the main body opposite to the clamping portion; the flange is formed between the first threaded portion and the second threaded portion; the locking ring is engaged with the second threaded portion; the locking member is engaged with the first threaded portion, and the connecting plate is sleeved on the second threaded portion and fixed by the locking ring.

13. The clamping mechanism of claim 10, wherein the clamping mechanism further comprises a rubber clamping ring positioned between the wire harness and an inner surface of the clamping portion.

* * * * *